US009704485B2

(12) United States Patent
Hu et al.

(10) Patent No.: US 9,704,485 B2
(45) Date of Patent: Jul. 11, 2017

(54) MULTIMEDIA INFORMATION RETRIEVAL METHOD AND ELECTRONIC DEVICE

(71) Applicant: TENCENT TECHNOLOGY (SHENZHEN) COMPANY LIMITED, Shenzhen, Guangdong (CN)

(72) Inventors: Peng Hu, Guangdong (CN); Teng Zhang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 290 days.

(21) Appl. No.: 14/613,989

(22) Filed: Feb. 4, 2015

(65) Prior Publication Data

US 2015/0154958 A1    Jun. 4, 2015

Related U.S. Application Data

(63) Continuation of application No. PCT/CN2013/081992, filed on Aug. 21, 2013.

(30) Foreign Application Priority Data

Aug. 24, 2012   (CN) .......................... 2012 1 0303990

(51) Int. Cl.
*G06F 17/30* (2006.01)
*G06F 17/27* (2006.01)
(Continued)

(52) U.S. Cl.
CPC .......... *G10L 15/26* (2013.01); *G06F 17/2735* (2013.01); *G06F 17/2755* (2013.01);
(Continued)

(58) Field of Classification Search
CPC ......... G10L 15/26; G10L 15/04; G10L 15/05; G10L 15/1822; G10L 15/22;
(Continued)

(56) References Cited

U.S. PATENT DOCUMENTS 4,829,572 A * 5/1989 Kong ...................... G10L 15/00
                                                          704/249
4,852,170 A * 7/1989 Bordeaux ............... G10L 15/00
                                                          704/254
(Continued)

FOREIGN PATENT DOCUMENTS

CN           1750117 A       3/2006
CN         101021857         8/2007
(Continued)

OTHER PUBLICATIONS

Chinese Office Action issued Sep. 23, 2014 in Chinese Application No. 201210303990.7 with partial English translation (7 pages).
(Continued)

*Primary Examiner* — Eric Yen
(74) *Attorney, Agent, or Firm* — Knobbe Martens Olson and Bear LLP

(57) ABSTRACT

The present invention relates to a multimedia information retrieval method and electronic device, the multimedia information retrieval method comprising the steps of: extracting from a to-be-retrieved multimedia the voice of the to-be-retrieved multimedia; recognizing the voice of the to-be-retrieved multimedia to obtain a recognized text; and retrieving a multimedia database according to the recognized text to obtain the multimedia information of the to-be-retrieved multimedia. The present invention also relates to an electronic device. The multimedia information retrieval method and electronic device of the present invention can automatically, quickly, and comprehensively present to a user the multimedia information the user wants to know, thus greatly improving user retrieval efficiency and retrieval success rate.

13 Claims, 6 Drawing Sheets

(51) Int. Cl.
*G10L 15/05* (2013.01)
*G10L 15/22* (2006.01)
*G10L 15/26* (2006.01)

(52) U.S. Cl.
CPC .... *G06F 17/2765* (2013.01); *G06F 17/30026* (2013.01); *G06F 17/30746* (2013.01); *G10L 15/05* (2013.01); *G10L 15/22* (2013.01)

(58) Field of Classification Search
CPC ......... G06F 17/30026; G06F 17/30746; G06F 17/27; G06F 17/2705; G06F 17/2735; G06F 17/2755; G06F 17/2765
See application file for complete search history.

(56) References Cited

U.S. PATENT DOCUMENTS

| | | | | |
|---|---|---|---|---|
| 5,170,432 A * | 12/1992 | Hackbarth | ............. | G10L 15/07 704/254 |
| 5,737,489 A * | 4/1998 | Chou | ................. | G10L 15/063 704/232 |
| 5,749,066 A * | 5/1998 | Nussbaum | ........... | G10L 15/063 704/232 |
| 5,758,023 A * | 5/1998 | Bordeaux | ............. | G10L 15/16 704/232 |
| 5,832,478 A * | 11/1998 | George | ............. | G06F 17/2735 |
| 5,835,924 A * | 11/1998 | Maruyama | .......... | G06F 17/2863 715/264 |
| 6,014,615 A * | 1/2000 | Chen | ..................... | G06F 3/018 345/171 |
| 6,032,111 A * | 2/2000 | Mohri | ................. | G06F 17/2755 704/257 |
| 6,185,528 B1 * | 2/2001 | Fissore | .................. | G10L 15/26 704/232 |
| 6,219,640 B1 | 4/2001 | Basu et al. | | |
| 6,345,252 B1 * | 2/2002 | Beigi | ................ | G06F 17/30746 704/251 |
| 6,892,191 B1 * | 5/2005 | Schaffer | ............ | G06F 17/30705 706/13 |
| 7,072,827 B1 * | 7/2006 | Carmel | .............. | G06F 17/2715 704/1 |
| 7,107,204 B1 * | 9/2006 | Liu | ..................... | G06F 17/273 704/2 |
| 7,165,019 B1 * | 1/2007 | Lee | .................... | G06F 17/2715 704/10 |
| 7,516,125 B2 * | 4/2009 | Rao | .................. | G06F 17/30622 |
| 7,676,365 B2 * | 3/2010 | Hwang | ................ | G10L 15/063 704/240 |
| 8,306,808 B2 * | 11/2012 | Elbaz | ................... | G06F 17/273 704/8 |
| 2002/0143531 A1 * | 10/2002 | Kahn | ..................... | G10L 15/26 704/235 |
| 2003/0093263 A1 * | 5/2003 | Chen | .................... | G06F 17/2715 704/10 |
| 2005/0027524 A1 * | 2/2005 | Wu | ....................... | G10L 15/187 704/235 |
| 2005/0038814 A1 * | 2/2005 | Iyengar | ............. | G06F 17/30038 |
| 2005/0060138 A1 * | 3/2005 | Wang | ..................... | G06F 3/018 704/1 |
| 2005/0071148 A1 * | 3/2005 | Huang | ................ | G06F 17/2755 704/4 |
| 2005/0216257 A1 * | 9/2005 | Tanabe | ............. | G06F 17/30743 704/200 |
| 2006/0080102 A1 * | 4/2006 | Roy | ........................ | G10L 13/08 704/260 |
| 2006/0190261 A1 * | 8/2006 | Wang | ..................... | G10L 15/197 704/260 |
| 2007/0124301 A1 * | 5/2007 | Elbaz | .................... | G06F 17/277 |
| 2007/0242071 A1 * | 10/2007 | Harding | ................ | G06F 17/276 345/469.1 |
| 2007/0285505 A1 * | 12/2007 | Korneliussen | ......... | H04N 7/147 348/14.08 |
| 2008/0071542 A1 * | 3/2008 | Yu | ........................... | G10L 15/26 704/270 |
| 2008/0085099 A1 * | 4/2008 | Guihot | .................. | G11B 27/10 386/201 |
| 2008/0221866 A1 * | 9/2008 | Katragadda | ......... | G06F 17/2223 704/8 |
| 2008/0300872 A1 * | 12/2008 | Basu | ................. | G06F 17/30017 704/235 |
| 2009/0031885 A1 * | 2/2009 | Bennetts | .............. | G10H 1/0058 84/610 |
| 2010/0145699 A1 * | 6/2010 | Tian | ........................ | G10L 15/07 704/257 |
| 2014/0180762 A1 * | 6/2014 | Gilbert | ............. | G06F 17/30752 705/7.29 |

FOREIGN PATENT DOCUMENTS

| | | |
|---|---|---|
| CN | 101206859 A | 6/2008 |
| CN | 101634987 | 1/2010 |
| CN | 102236686 A | 11/2011 |
| CN | 102404278 A | 4/2012 |

OTHER PUBLICATIONS

International Search Report for PCT/CN2013/081992, mailed Nov. 28, 2013, 2 pages.

* cited by examiner

MULTIMEDIA INFORMATION RETRIEVAL METHOD AND ELECTRONIC DEVICE

CROSS-REFERENCE TO RELATED APPLICATION

This application claims priority to and is a continuation of PCT/CN2013/081992, filed on Aug. 21, 2013, and entitled "MULTIMEDIA INFORMATION RETRIEVAL METHOD AND ELECTRONIC DEVICE", which claims the benefit of Chinese Patent Application No. 201210303990.7, filed with the Chinese Patent Office on Aug. 24, 2012, and entitled "SONG INFORMATION RETRIEVAL METHOD AND DEVICE AND CORRESPONDING SERVER", the contents of which are incorporated herein by reference in their entirety.

TECHNICAL FIELD

The present disclosure relates to the field of information retrieval technologies, and in particular, to a multimedia information retrieval method and an electronic device.

BACKGROUND

When listening to songs, users sometimes wish to learn more information about the songs. For example, when listening to a favorite song in a computer, a user may wish to further know the name of the song, the singer or other background information about the song. In order to obtain relevant information of the song, the user generally has to memorize a fragment of words of the song, and then search for the words on the Internet. This process requires the user to quickly recognize and memorize the words of the song and have the ability of distinguishing search results. Therefore, the search process is complex and prone to error.

SUMMARY

Technical Problems

An aspect of the present disclosure provides a multimedia information retrieval method and an electronic device, which may automatically, quickly and comprehensively present the multimedia information desired by a user to the user, thereby greatly improving the efficiency and success rate of retrieving by the user, and solving the technical problem that the process of the existing multimedia retrieval is complex and prone to error.

Solutions for the Problems

Solutions

In order to solve the above problem, following solutions are provided according to the present disclosure.

The present disclosure provides a multimedia information retrieval method, which includes steps of:

extracting a voice of multimedia to be retrieved from the multimedia to be retrieved;

recognizing the voice of the multimedia to be retrieved to obtain a recognized text; and retrieving in a multimedia database according to the recognized text to obtain multimedia information of the multimedia to be retrieved.

The present disclosure further provides an electronic device including:

one or more processors;

a storage; and one or more computer programs stored on the storage and configured to cause the one or more processors to perform a multimedia information retrieval method wherein the one or more computer programs comprises, by functions:

a voice extracting module configured to extract a voice of multimedia to be retrieved from the multimedia to be retrieved;

a voice recognizing module configured to recognize the voice of the multimedia to be retrieved to obtain a recognized text; and a retrieving module configured to retrieve in a multimedia database according to the recognized text to obtain the multimedia information of the multimedia to be retrieved.

The present disclosure further provides an electronic device including:

one or more processors;

a storage; and one or more computer programs stored on the storage and configured to be performed by the one or more processors to provide a multimedia information retrieval method wherein the one or more computer programs comprises, by functions:

a multimedia database configured to store multimedia information;

a download module configured to download multimedia to be retrieved by retrieving a download link for the multimedia to be retrieved;

a voice extracting module configured to extract a voice of the multimedia to be retrieved from the multimedia to be retrieved;

a voice recognizing module configured to recognize the voice of the multimedia to be retrieved to obtain a recognized text; and a retrieving module configured to retrieve in the multimedia database according to the recognized text to obtain the multimedia information of the multimedia to be retrieved.

Beneficial Effects of the Present Disclosure

Beneficial Effect

Compared with the existing multimedia information retrieval method, the multimedia information retrieval method and the electronic device according to the present disclosure may automatically, quickly and comprehensively present the multimedia information as desired by a user to the user, thereby greatly improving the efficiency and success rate of retrieving by the user. The technical problem that the existing multimedia information retrieving process is complex and error-prone is solved.

BRIEF DESCRIPTION OF THE DRAWINGS

In order to more clearly illustrate the technical solutions of the embodiments of the present invention or the prior art, the drawings used for the description of the embodiments of the present invention or the prior art will be briefly introduced below. Apparently, the drawings in the description below merely illustrate some embodiments of the invention, and other drawings can be made according to these drawings by those ordinary skilled in the art without creative work.

DETAILED DESCRIPTION OF THE EMBODIMENTS

Figure 1:
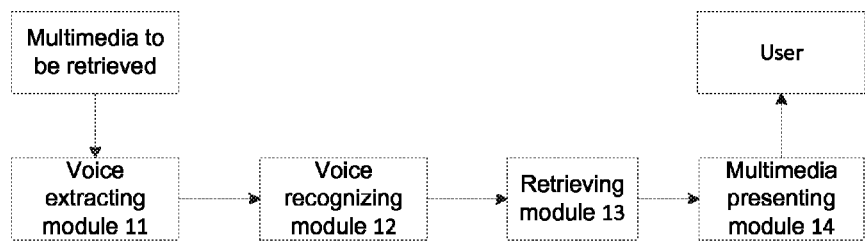
FIG. 1 is a schematic diagram illustrating the structure of an electronic device according to a preferable embodiment of the present invention.

Referring to the drawings, the same reference number denotes to the same component, and principles of the present disclosure are illustrated by implementation thereof in a suitable computing environment. The following description is based on the illustrated embodiment of the present invention, and is not intended to limit other embodiments which are not detailedly described in the present disclosure.

In the following description, embodiments of the present invention will be illustrated with reference to symbols and steps of operations performed by one or more computers, unless otherwise stated. Therefore, it will be understood that these steps and operations, which are described below for many times to be performed by computer, include manipulations of a computer processing unit on electronic signals in the form of structuralized data. Such manipulations convert the data or maintain the data at a position in a memory system of the computer, to reconfigure or otherwise change the operations of the computer in a manner well known to a person skilled in the art. The data is maintained in the data structure at a physical location in the memory and has a specific characteristic which is defined by the data structure. However, the following description of the principles of the present disclosure is not intended for limiting, and it may be understood by a person skilled in the art that the steps and operations described below can also be implemented by hardware.

The principles of the present disclosure may be implemented with many generic calculations or specialized calculations, communication environments or configurations. Well known examples of computing systems, environments and configuration applicable to the present disclosure may include (but not limited to) a mobile phone, a personal computer, a server, a multiprocessor system, a microprocessor-based system, a mainframe computer and a distributed computing environment, including any previous system or device.

The present disclosure provides an electronic device, referring to FIG. 1 which is a schematic diagram illustrating the structure of the electronic device according to a preferable embodiment of the present invention. The electronic device includes a voice extracting module 11, a voice recognizing module 12, a retrieving module 13 and a multimedia presenting module 14. The voice extracting module 11 is configured to extract, from multimedia to be retrieved, a voice of the multimedia to be retrieved. The voice recognizing module 12 is configured to recognize the voice of the multimedia to be retrieved to obtain a recognized text. The retrieving module 13 is configured to retrieve in a multimedia database according to the recognized text, to obtain multimedia information of the multimedia to be retrieved. The multimedia presenting module 14 is configured to present the multimedia information to a user.

The retrieving module 13 includes an undetermined recognition code determining unit, a recognition code determining unit and a retrieving unit. The undetermined recognition code determining unit is configured to perform word segmentation on the recognized text according to a preset word library to obtain a plurality of undetermined recognition codes, the recognition code determining unit is configured to determine a plurality of recognition codes according to word occurrence frequencies of the undetermined recognition codes in the word library, and the retrieving unit is configured to retrieve in the multimedia database according to the plurality of recognition codes to obtain multimedia information of the multimedia to be retrieved.

In the use of the electronic device according to the present disclosure, the user listening to music may play local multimedia or network multimedia downloaded to the local via a music player. If the user wants to learn about multimedia information of the played multimedia, a human voice is extracted from the multimedia by the voice extracting module 11 and sent to the voice recognizing module 12; the human voice is recognized by the voice recognition module 12 to obtain the recognized text which is then sent to the undetermined recognition code determining unit of the retrieving module 13; word segmentation is performed on the recognized text by the undetermined recognition code determining unit of the retrieval module 13 according to the preset word library to obtain a plurality of undetermined recognition codes; and then a plurality of recognition codes are determined by the recognition code determining unit of the retrieval module 13 according to the word occurrence frequencies of the undetermined recognition codes (which are determined by the undetermined recognition code determining unit) in the word library, and then the determined recognition codes are sent to the retrieval unit of the retrieval module 13 by the recognition code determining unit of the retrieval module 13; the retrieval unit of the retrieval module 13 sends a request to the multimedia database to retrieve in the multimedia database according to the above recognition codes to obtain corresponding multimedia information; at last, the multimedia information retrieved by the retrieval unit is presented by the multimedia presenting module 14 to the user. Of course, the multimedia information may be returned to the user in any other ways.

The particular working principle of the electronic device according to the present disclosure is the same as or similar to a multimedia information retrieval method according to the following embodiments, and reference may be further made to the multimedia information retrieval method according to the following embodiments. The various modules of the electronic device according to the present disclosure may be integrated with each other, or any of the modules may be divided into a plurality of independently functioning modules, which can be connected directly or indirectly with each other.

Figure 2:
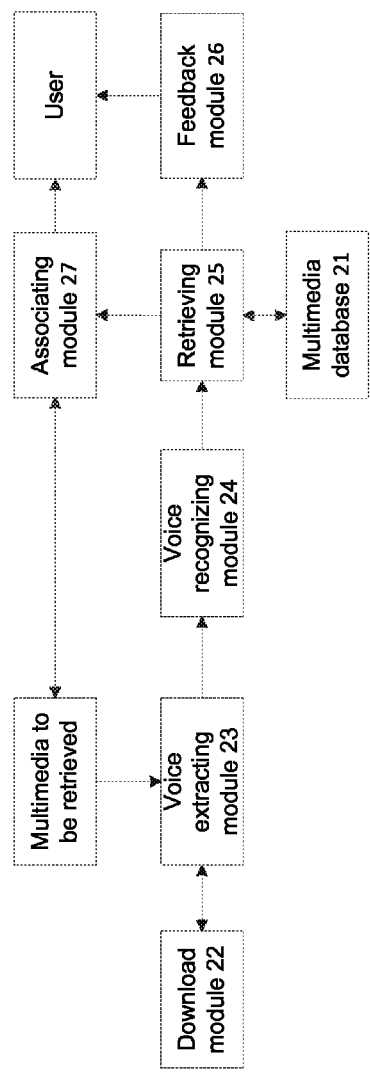
FIG. 2 is a schematic diagram illustrating the structure of an electronic device according to a preferable embodiment of the present invention.

An electronic device is further provided according to the present disclosure as illustrated in FIG. 2 which is a schematic diagram illustrating the structure of the electronic device according to a preferable embodiment of the present invention. The electronic device includes a multimedia database 21, a download module 22, a voice extracting module 23, a voice recognizing module 24, a retrieving module 25, a feedback module 26 and an associating module 27. The multimedia database 21 is configured to store multimedia information; the download module 22 is configured to download multimedia to be retrieved through a download link for the multimedia to be retrieved; the voice extraction module 23 is configured to extract a voice of the multimedia to be retrieved from the multimedia to be retrieved; the voice recognition module 24 is configured to recognize the voice of the multimedia to be retrieved to obtain a recognized text; the retrieval module 25 is configured to retrieve in the multimedia database 21 according to the recognized text to obtain multimedia information of the multimedia to be retrieved; the feedback module 26 is configured to return the multimedia information to a user; and the associating module 27 is configured to associate the download link obtained by the download module 22 with the corresponding multimedia information.

The retrieving module 25 includes an undetermined recognition code determining unit, a recognition code determining unit and a retrieving unit. The undetermined recognition code determining unit is configured to perform word segmentation on the recognized text according to a preset word library to obtain a plurality of undetermined recognition codes, the recognition code determining unit is configured to determine a plurality of recognition codes according to word occurrence frequencies of the undetermined recognition codes in the word library, and the retrieving unit is configured to retrieve the recognition codes in the multimedia database to obtain the multimedia information of the multimedia to be retrieved.

The multimedia information retrieving device (i.e. the electronic device as shown in FIG. 1) is integrated with the multimedia database 21 at the side of the server to form the electronic device according to the present disclosure, such that the multimedia information of the multimedia to be retrieved may be returned to the user listening to music by the electronic device, as long as the download link for the multimedia is sent to the electronic device by the user, which facilitates the operations of the user listening to music.

In the use of the electronic device according to the present disclosure, the user listening to music may access a music webpage via a browser. If the user wants to learn about multimedia information of the multimedia on the webpage, the multimedia may be downloaded to the electronic device by the download module 22 of the electronic device according to the download link for the multimedia. The voice extracting module 23 extracts a human voice from the multimedia and sends the human voice to the voice recognizing module 24. The voice recognizing module 24 recognizes the human voice to obtain a recognized text and sends the recognized text to the undetermined recognition code determining unit of the retrieving module 25. The undetermined recognition code determining unit of the retrieving module 25 performs word segmentation on the recognized text according to a preset word library to obtain a plurality of undetermined recognition codes. The recognizing code determining unit of the retrieving module 25 determines a plurality of recognition codes according to word occurrence frequencies of the undetermined recognition codes (which are determined by the undetermined recognition code determining unit) in the word library, and further sends the determined recognition codes to the retrieving unit of the retrieval module 25. The retrieving unit of the retrieval module 25 sends a request to the multimedia database 21 to retrieve in the multimedia database according to the recognition codes to obtain corresponding multimedia information. At last, the feedback module 26 returns the multimedia information retrieved by the retrieving unit to the user.

Further, the electronic device according to the present disclosure further includes an associating module 27, which is configured to associate the download link obtained by the download module 22 with the corresponding multimedia information. As such, if the download link obtained from the user listening to music is the same as that stored in the electronic device, a retrieval result of the corresponding multimedia information which is associated with the download link by the associating module 27 is directly returned to the user, thereby considerably reducing processing resources for the recognition and retrieval.

The particular working principle of the electronic device according to the present disclosure is the same as or similar to a multimedia information retrieval method according to the following embodiments, and reference may be further made to the multimedia information retrieval method according to the following embodiments. The various modules of the electronic device according to the present disclosure may be integrated with each other, or any of the modules may be divided into a plurality of independently functioning modules, which can be connected directly or indirectly with each other.

Figure 3:
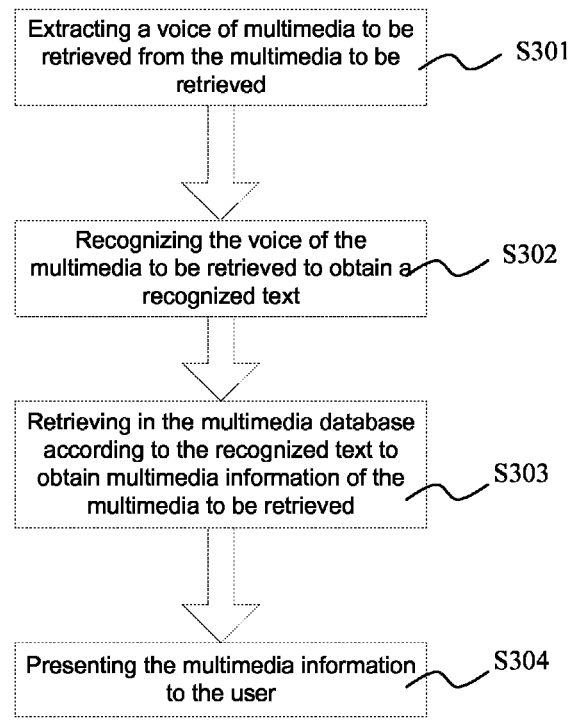
FIG. 3 is a flow chart illustrating a multimedia information retrieval method according to a preferable embodiment of the present invention.

A multimedia information retrieval method is further provided according to the present disclosure, as illustrated in FIG. 3 which is a flow chart illustrating a multimedia information retrieval method according to a preferable embodiment of the present invention. The multimedia information retrieval method includes:

Step S301: a voice of multimedia to be retrieved is extracted from the multimedia to be retrieved;

Step S302: the voice of the multimedia to be retrieved is recognized to obtain a recognized text;

Step S303: retrieve in the multimedia database according to the recognized text to obtain multimedia information of the multimedia to be retrieved; and Step S304: the multimedia information is presented to the user.

Figure 4:
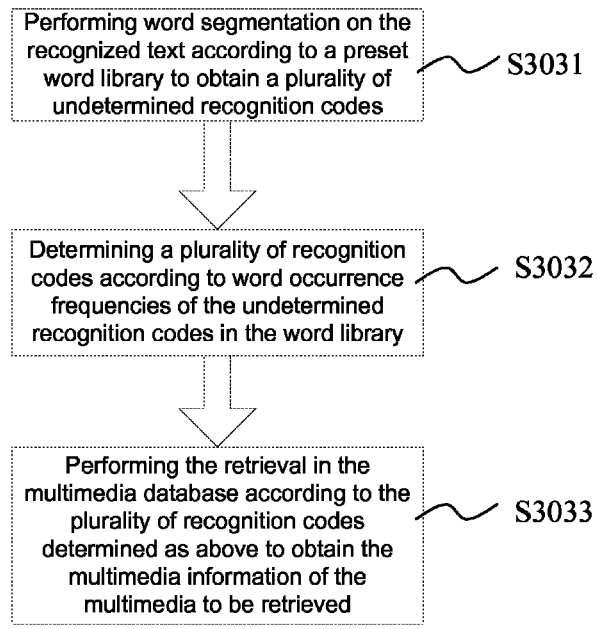
FIG. 4 is a detailed flow chart illustrating Step 303 of the multimedia information retrieval method shown in FIG. 1.

The detailed flows of the steps of the multimedia information retrieval method according to the present disclosure will be specifically illustrated with reference to FIGS. 3 and 4. FIG. 4 is a detailed flow chart illustrating Step S303 of the multimedia information retrieval method shown in FIG. 3.

In Step S301, the voice of the multimedia to be retrieved is extracted from the multimedia. In this step, generally, the singer's voice is extracted from the multimedia, for example by a voice separation method such as Auditory Scene Analysis or blind signal separation, therefore a voice signal of the singer is output. In selecting the duration of the multimedia, whole or a fragment of the multimedia may be selected. Generally, more computing resources will be consumed as the selected duration of the multimedia voice is longer, but more information may be provided for the subsequent steps, which is advantageous for a precise retrieval in the subsequent steps.

In Step S302, the voice of the multimedia to be retrieved is recognized to obtain the recognized text. In this step, a voice signal of the singer is converted into the recognized text, that is, a word content of the human voice is converted into a computer-readable input such as keys, binary codes or character sequences. The recognized text may include a plurality of recognition codes, which include, but are not limited to Chinese characters, Chinese words, Pinyin, English letters and/or English words, and so on. So far, the specific voice recognizing process may be implemented by a voice recognition method such as statistical pattern recognition technology. Due to an uncertain error rate of the voice recognition per se, the duration of the multimedia selected for extraction may be lengthened to lower an error rate of the subsequent multimedia retrieval which is caused by the error in the voice recognition.

As illustrated in FIG. 4, Step S303 includes the following Steps S3031, S3032, S3033, and S3034.

At Step S3031, word segmentation is performed on the recognized text according to a preset word library to obtain a plurality of undetermined recognition codes.

Due to the error rate of the voice recognition, if the recognized text obtained by recognition is directly used for retrieving, the retrieval may be failed due to a possible little recognition error. Therefore, the word segmentation is performed on the recognized text according to the preset word library to obtain a plurality of smaller units from the recognized text, i.e. the undetermined recognition codes.

The undetermined recognition codes include, but are not limited to Chinese characters, Chinese words, Pinyin, English letters and/or English words, and so on, which specifically depends on the type of the preset word library. If only Chinese characters and words are included in the preset word library, the recognized text is divided into a plurality of undetermined recognition codes merely formed by Chinese characters or words. If Chinese characters and words as well as Pinyin are included in the preset word library while Pinyin retrieval is also supported in the multimedia database, some Chinese characters which cannot be recognized may be retrieved by using the Pinyin of these Chinese characters, thereby further improving the retrieval quality and avoiding the retrieval error. If both of Chinese characters and words as well as English letters and words are included in the preset word library, multimedia containing English letters and words or multimedia merely including English letters and words can be retrieved directly.

At Step S3032, a plurality of recognition codes are determined according to word occurrence frequencies of the undetermined recognition codes in the word library.

Each undetermined recognition code from the word library has a property of word occurrence frequency, and the value of the word occurrence frequency of the undetermined recognition code indicates how often the undetermined recognition code is used in daily life (the word library is formed by summarizing languages frequently used over a network). If the undetermined recognition code is used more frequently in daily life, the value of the word occurrence frequency of the undetermined recognition code will be larger, otherwise the value of the word occurrence frequency of the undetermined recognition code will be smaller.

In order to reduce resources consumed by the retrieval, some of the undetermined recognition codes are selected according to the word occurrence frequencies of the undetermined recognition codes in the word library and used as the recognition codes for the multimedia retrieval. The specific progress is as follows.

The undetermined recognition codes are sorted in an order of increasing word occurrence frequencies of the undetermined recognition codes in the word library; and then n undetermined recognition codes with the lowest word occurrence frequencies are selected, and further m undetermined recognition codes are randomly selected, so that each one of the n undetermined recognition codes is different from any one of the m undetermined recognition codes; as such, the n undetermined recognition codes and the m undetermined recognition codes are set as the plurality of recognition codes, herein n is equal to or larger than 1, and m is equal to or larger than 0. Due to the fact that the word occurrence frequencies of the n undetermined recognition codes are relatively low, an accurate retrieval result can be ensured; meanwhile, the using of the M undetermined recognition codes can avoid a possible retrieval failure which is caused by the low word occurrence frequencies of the n undetermined recognition codes (the retrieval here is fuzzy retrieval, which means that a retrieval result merely satisfying partial retrieval conditions might be returned to the user). The values of n and m can be flexibly set as desired by the user.

At Step S3033, the retrieval is performed in the multimedia database according to the plurality of recognition codes determined as above, to obtain the multimedia information of the multimedia to be retrieved.

The retrieval process can be adjusted depending on the retrieval result. If the retrieval result is excessively massive, a new recognition code obtained from the undetermined recognition codes may be accordingly introduced into the retrieval or the retrieval conditions may be refined, so that the retrieval result which is better satisfying the retrieval conditions will be returned to the user. If a retrieval failure is returned, the recognition codes may be accordingly reduced to perform the retrieval again, to avoid the retrieval failure caused by any recognition codes which are generated by an error in the voice recognition. The specific retrieval process can be adjusted depending on the practical situation, but the specific retrieval process does not cause any prejudice to the scope of the present disclosure. The multimedia database may be a local multimedia database in the local computer, or a network multimedia database in the server in the network.

In Step S304, the multimedia information as retrieved is presented to the user. The multimedia information here may be various related information about the retrieval multimedia, includes but is not limited to the song title, the singer, song lyrics, album, background information, music score, a download link for the multimedia, and so on. The download link for the multimedia, such as a free download link for online multimedia and the free authorized link corresponding to the local multimedia may be presented to some users.

As such, the multimedia to be retrieved is automatically retrieved through the above Steps S301 to S304, and the retrieval result is quickly returned to the user listening to the music.

Figure 5:
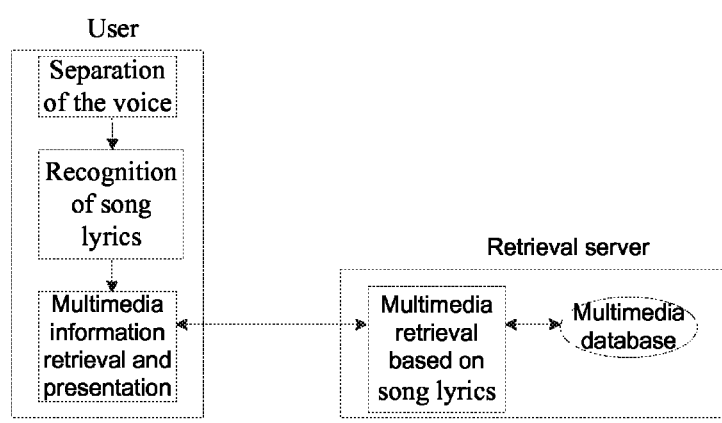
FIG. 5 is a schematic diagram illustrating a multimedia information retrieval method which is employed at the side of a client according to the present disclosure.

The multimedia information retrieval method according to the present disclosure may be used at the side of a client, as shown in FIG. 5 which is a schematic diagram illustrating the use of the multimedia information retrieval method according to the present disclosure at the side of a client. In this case, the voice extracting, voice recognizing and retrieval result presenting are all performed in the client, while the multimedia database used for retrieving is located at the side of a server, which is just configured to retrieve.

Figure 6:
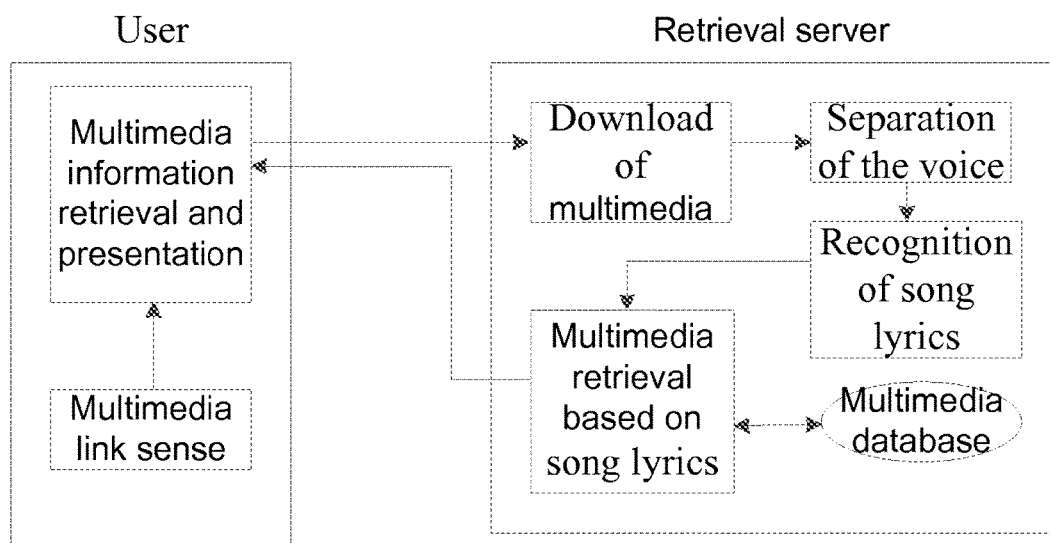
FIG. 6 is a schematic diagram illustrating a multimedia information retrieval method which is employed at the side of a server according to the present disclosure.

The multimedia information retrieval method of the present disclosure may be used at the side of the server, as shown in FIG. 6 which is a schematic diagram illustrating the use of the multimedia information retrieval method according to the present disclosure at the side of the server. In this case, the user may send the download link for the multimedia to a retrieval server through a web browser, and the retrieval server returns a retrieval result to the user. The retrieval server here not only retrieves and downloads the multimedia, but also performs the voice extraction, the voice recognition, the retrieval result feedback, and so on, for the sake of easier operations by the user.

A person skilled in the art can understand that all or a part of the steps of the method in the above embodiments may be performed by related hardware as instructed by a computer program. The computer program can be stored in a computer readable storage medium. When the computer program is executed, the steps of the above method in the embodiments are performed. The storage medium may be a disk, a Compact Disk (CD), a Read Only Memory (ROM), a Random Access Memory (RAM), and so on.

The multimedia information retrieval method, the electronic device and the storage medium of the present disclosure may automatically, quickly and comprehensively present the multimedia information which the user wants to learn about to the user, thereby greatly improving the listening experience of the user, and solving the technical problem that the process of the existing multimedia retrieval is complex and prone to error. The electronic device of the present disclosure can simplify user operations to retrieve multimedia on a user computer; additionally, the retrieval on the server may be performed as requested by the electronic device according to the request from the user and merely the retrieval result is returned to the user, thereby further simplifying the user operations.

The terms "module", "component", "system", "interface" and so on used in the present application are generally intended to refer to computer-related entities, such as hardware, a combination of software and hardware, software, or software in execution. For example, the component may be, but is not limited to a process running in a processor, the processor, an object, an executable application, an executable thread, a computer program and/or computers. As shown in the figures, both of the controller and the application running on the controller may be the components. One or more components may exist in a process and/or a thread in execution, and the components may be located in a computer, or distributed between two computers or among more computers.

Also, the claimed subject matter of the present disclosure may be implemented in such a way that a computer is controlled by a software, a firmware, a hardware or a combination thereof produced by the standard programming and/or engineering technology to implement the method, device and product disclosed by the subject matter. The term "product" used in the present disclosure intends to include computer programs which are accessible from any computer-readable device, carrier or media. Of course, various modifications of the configuration in the present disclosure can be made by a person skilled in the art without departing from the scope or spirit of the invention.

Figure 7:
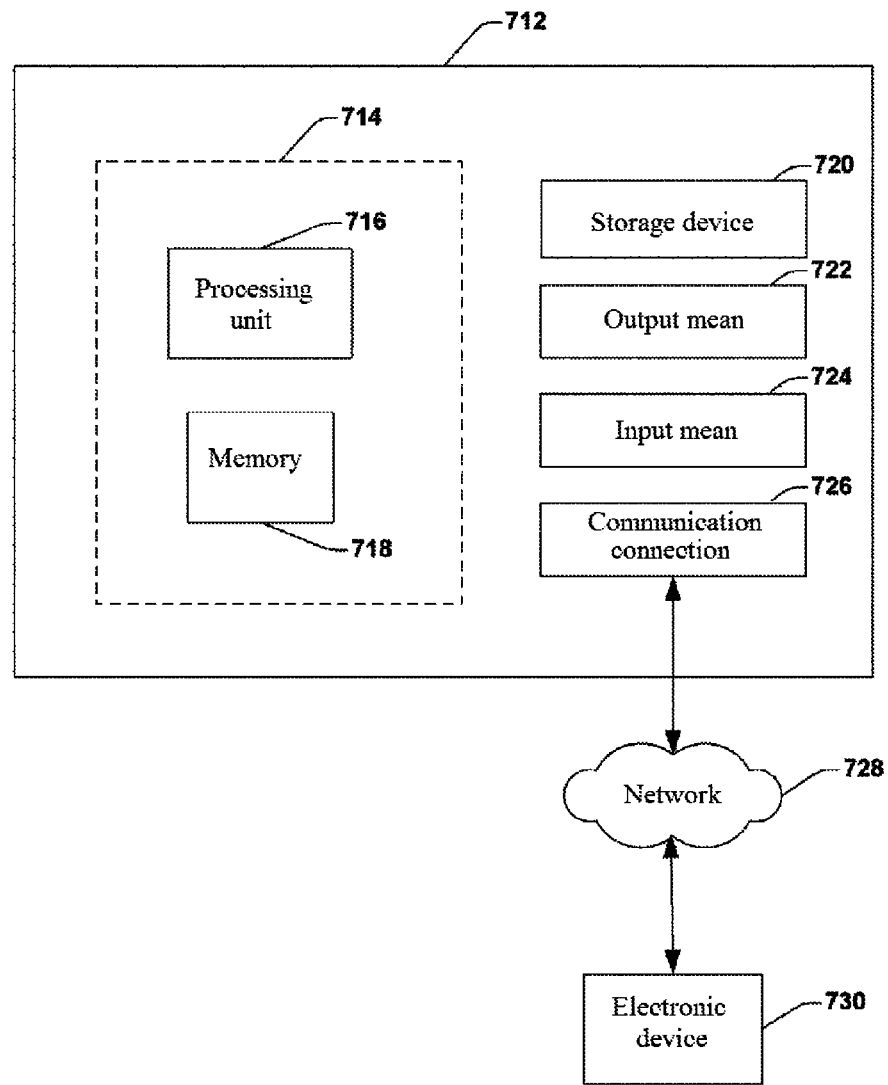
FIG. 7 is a schematic diagram illustrating a work environment for an electronic device according to the present disclosure.

Brief and general description on a work environment of the electronic device according to the present disclosure is provided with reference to FIG. 7 and discussion below. The working environment shown in FIG. 7 is just an example of a suitable working environment and is not intended to limit the scope of the use and function of the working environment. An instance of an electronic device 712 includes but is not limited to a personal computer, a server computer, a hand-held or laptop device, a mobile device (such as a mobile phone, a personal digital assistant (PDA), a media player, etc.), a multi-processor system, a consumer electronic device, a minicomputer, a mainframe computer, a distributed computing environment including any of the above systems or devices and so on.

Although not necessarily required, embodiments of the present invention are described in a common background that computer-readable instructions are performed by one or more electronic devices. The computer-readable instructions may be distributed via computer-readable media (as discussed below). The computer-readable instructions may be implemented as program modules such as functions, objects, application programming interfaces (APIs), and data structures which are configured to perform specific tasks or implement particular abstract data types. Typically, the functions of the computer-readable instructions may be combined or distributed as will in various environments.

FIG. 7 shows an example of the electronic device 712 embodying the multimedia information retrieval method according to one or more embodiments of the present invention. In a configuration, the electronic device 712 includes at least one processing unit 716 and a memory 718. Depending on the specific configuration and type of the electronic device, the memory 718 may be a volatile storage (such as RAM), a non-volatile storage (such as ROM and flash memory), or a combination thereof. The configuration is shown by dashed lines 714 in FIG. 7.

In other embodiments, the electronic device 712 may include additional characteristics and/or functions. For example, the electronic device 712 further includes an additional storage device (such as a removable storage device and/or a non-removable storage device), which includes but is not limited to a magnetic storage device, an optical storage device and so on. The additional storage device is shown as a storage device 720 in FIG. 7. In one embodiment, the computer-readable instructions which are configured to implement one or more embodiments of the present invention may be stored in the storage device 720. The storage device 720 may store other computer-readable instructions which are configured to implement an operating system, application programs and so on. The computer-readable instructions may be loaded in the memory 718 and performed by the processing unit 716.

The term "computer-readable media" used in the present disclosure includes computer storage media. The computer storage media include a volatile storage medium, a non-volatile storage medium, a removable storage medium and a non-removable storage medium, which may be implemented by any method or technology and configured to store information such as computer-readable instructions and other data. The memory 718 and the storage device 720 are examples of the computer storage media. The computer storage media include but are not limited to a RAM, a ROM, an EEPROM, a flash memory or any other memory, a CD-ROM, a digital versatile disc or any other optical storage, a cassette tape, a magnetic tape, a magnetic disk storage or any other magnetic storage device, or any other media configured to store the desired information and accessible by the electronic device 712. Any one of the above computer storage media may be a part of the electronic device 712.

The electronic device 712 may further include a communication connection 726 to enable communication with other devices. The communication connection 726 may further include but not limited to a modulator-demodulator, a network interface card (NIC), an integrated network interface, a radio frequency transmitter/receiver, an infrared port, a USB connection or other interfaces which connect the electronic device 712 to other devices. The communication connection 726 may include wired or wireless connection. The communication connection 726 may transmit and/or receive communication media.

The term "computer-readable media" may include communication media. The communication media typically includes any media for transmitting information such as computer-readable instructions or other data in a modulated data signal carried in a carrier or other transport mechanism. The term "modulated data signal" may include such a signal of which one or more characteristics are set or changed according to a manner of encoding information to the signal.

The electronic device 712 may include input means 724 such as a keyboard, a mouse, a pen, voice input means, touch input means, an infrared camera, video input means, and/or other input means. The electronic device 712 also includes output means 722 such as one or more displays, speakers, printers and/or any other output means. The input means 724 and the output means 722 may be connected to the electronic device 712 via wired connections, wireless connections or any combination thereof. In one embodiment, input means and output means from another electronic device may be used as the input means 724 and the output means 722 of the electronic device 712.

Components of the electronic device 712 may be connected via various interconnections (such as a bus). The interconnections may include a peripheral component interconnection (PCI) (such as fast PCI) a universal serial bus (USB), a firing line (IEEE 1394), an optical bus structure, and so on. In another embodiment, components of the electronic device 712 may be interconnected via a network. For example, the memory 718 may be composed of physical storage units which are located in different physical locations but interconnected via a network.

A person skilled in the art may realize that the storage device configured to store the computer-readable instructions may be distributed across the network. For example, the electronic device 730 which is accessible via a network 728 may store the computer-readable instructions configured to implement one or more embodiments of the present invention. The electronic device 712 may access the electronic device 730 and download all of or a part of the computer-readable instructions for executing. Alternatively, the electronic device 712 may download a plurality of computer-readable instructions as desired, or, it is possible that some instructions are executed at the electronic device 712 and some other instructions are executed at the electronic device 730.

The present disclosure provides various operations in embodiments. In one embodiment, one or more operations may constitute computer-readable instructions stored on one or more computer-readable media, which, when being executed by the electronic device, cause the electronic device to perform the operations. The sequence of describing a part or all of the operations should not be construed to imply that the operations must be performed in such sequence. A person skilled in the art will think of an alternative sequence having the benefits of the present disclosure. Also, it is appreciated that not all of the operations must be included in each embodiment according to the present disclosure.

The term "preferable" is intended to provide an example, an instance or an illustration. Any aspect or design that is described as preferable is not necessarily interpreted as better than other aspects or designs. On the contrary, the use of the term "preferable" is to propose a concept in a specific way. Furthermore, the term "or" as used herein is intended to mean an inclusive "or" rather than an exclusive "or". That is, unless specified otherwise or derived clearly from the context, the phrase "X employs A or B" is intended to include any of permutations, of course. That is, the phrase "X employs A or B" means any of the following instances: X employs A; X employs B; or X employs both A and B.

Also, although the present disclosure has been illustrated and described with reference to one or more implementations, a person skilled in the art may make equivalent modifications and variations based on the reading and understanding on the specification and drawings. The present disclosure includes all of the modifications and variations, and is limited only by the scope of the appended claims. Furthermore, although a specific feature of the present disclosure is disclosed in one of a number of embodiments, the feature may be combined with one or more other features of other embodiments, if desirable and advantageous for a given or specific application. Furthermore, the term "include", "have", "composed of" or other variants as used in the embodiments or claims intends to means inclusion in the same manner as the term "include".

As can be seen from the above, although the preferred embodiments of the present invention have been disclosed as above, the preferred embodiments do not intend to limit the present disclosure, a person skilled in the art may made various variations and modifications without departing from the scope and spirit of the present disclosure, and the scope of the present disclosure should be defined by the claims.

What is claimed is:

1. A multimedia information retrieval method, comprising steps of:
    extracting a voice of multimedia to be retrieved from multimedia to be retrieved;
    recognizing the voice of the multimedia to be retrieved to obtain a recognized text; and
    retrieving multimedia information of the multimedia to be retrieved in a multimedia database according to the recognized text, wherein, retrieving multimedia information of the multimedia to be retrieved in the multimedia database according to the recognized text comprises:
        performing word segmentation on the recognized text according to a preset word library to obtain a plurality of undetermined recognition codes;
        determining a plurality of recognition codes according to word occurrence frequencies of the undetermined recognition codes in the word library; and
        retrieving the plurality of recognition codes in the multimedia database to obtain the multimedia information of the multimedia to be retrieved.

2. The method according to claim 1, wherein, the undetermined recognition codes comprise at least one of Chinese characters, Pinyin or English words.

3. The method according to claim 1, wherein determining the plurality of recognition codes according to the word occurrence frequencies of the undetermined recognition codes in the word library comprises:
    selecting n undetermined recognition codes with the lowest word occurrence frequencies in the word library from the plurality of undetermined recognition codes;
    randomly selecting m undetermined recognition codes, wherein each one of the n undetermined recognition codes is different from any one of the m undetermined recognition codes; and
    setting the n undetermined recognition codes and the m undetermined recognition codes as the plurality of recognition codes, wherein n is equal to or larger than 1, and m is equal to or larger than 0.

4. The method according to claim 1, further comprising a step of:
    presenting the multimedia information to a user, wherein the multimedia information comprises at least one of song title, singer, song lyrics, album, background information, music score, or download link for the multimedia.

5. An electronic device, comprising:
    one or more processors;

a storage; and
one or more computer programs stored on the storage and configured to cause the one or more processors to perform a multimedia information retrieval method, wherein the one or more computer programs comprise:
a voice extracting module configured to extract a voice of multimedia to be retrieved from multimedia to be retrieved;
a voice recognizing module configured to recognize the voice of the multimedia to be retrieved to obtain a recognized text; and
a retrieving module configured to retrieve multimedia information of the multimedia to be retrieved in a multimedia database according to the recognized text, wherein the retrieving module further comprises:
an undetermined recognition code determining unit configured to perform word segmentation on the recognized text according to a preset word library to obtain a plurality of undetermined recognition codes;
a recognition code determining unit configured to determine a plurality of recognition codes according to word occurrence frequencies of the undetermined recognition codes in the word library; and
a retrieving unit configured to retrieve the recognition codes in the multimedia database to obtain the multimedia information of the multimedia to be retrieved.

6. The electronic device according to claim 5, wherein, the undetermined recognition codes comprise at least one of Chinese characters, Pinyin or English words.

7. The electronic device according to claim 5, wherein, the recognition code determining unit is configured to:
select n undetermined recognition codes with the lowest word occurrence frequencies in the word library from the plurality of undetermined recognition codes;
randomly select m undetermined recognition codes, so that each one of the n undetermined recognition codes is different from any one of the m undetermined recognition codes; and
set the n undetermined recognition codes and the m undetermined recognition codes as the plurality of recognition codes, wherein n is equal to or larger than 1, and m is equal to or larger than 0.

8. The electronic device according to claim 5, wherein the one or more computer programs further comprise:
a multimedia presenting module configured to present the multimedia information to a user, wherein the multimedia information comprises at least one of song title, singer, song lyrics, album, background information, music score, or download link for the multimedia.

9. An electronic device, comprising:
one or more processors;
a storage; and
one or more computer programs stored on the storage and configured to cause the one or more processors to provide a multimedia information retrieval method, wherein the one or more computer programs comprise:
a multimedia database configured to store multimedia information;
a download module configured to download multimedia to be retrieved by a download link for the multimedia to be retrieved;
a voice extracting module configured to extract a voice of the multimedia to be retrieved from the multimedia to be retrieved;
a voice recognizing module configured to recognize the voice of the multimedia to be retrieved to obtain a recognized text; and
a retrieving module configured to retrieve multimedia information of the multimedia to be retrieved in the multimedia database according to the recognized, wherein the retrieving module comprises:
an undetermined recognition code determining unit configured to perform word segmentation on the recognized text according to a preset word library to obtain a plurality of undetermined recognition codes;
a recognition code determining unit configured to determine a plurality of recognition codes according to word occurrence frequencies of the undetermined recognition codes in the word library; and
a retrieving unit configured to retrieve the recognition codes in the multimedia database to obtain the multimedia information of the multimedia to be retrieved.

10. The electronic device according to claim 9, wherein, the undetermined recognition codes comprise at least one of Chinese characters, Pinyin and English words.

11. The electronic device according to claim 9, wherein, the recognition code determining unit is configured to:
select n undetermined recognition codes with the lowest word occurrence frequencies in the word library from the plurality of undetermined recognition codes;
randomly select m undetermined recognition codes, so that each one of the n undetermined recognition codes is different from any one of the m undetermined recognition codes; and
set the n undetermined recognition codes and the m undetermined recognition codes as the plurality of recognition codes, wherein n is equal to or larger than 1, and m is equal to or larger than 0.

12. The electronic device according to claim 9, wherein, the one or more computer programs further comprise a feedback module configured to return the multimedia information of the multimedia to be retrieved to a user, wherein the multimedia information of the multimedia to be retrieved comprises at least one of song title, singer, song lyrics, album, background information, music score, or download link for the multimedia.

13. The electronic device according to claim 9, wherein, the one or more computer programs further comprise an associating module configured to associate the download link for the multimedia to be retrieved with the multimedia information of the multimedia to be retrieved.

* * * * *

UNITED STATES PATENT AND TRADEMARK OFFICE
CERTIFICATE OF CORRECTION

PATENT NO. : 9,704,485 B2  
APPLICATION NO. : 14/613989  
DATED : July 11, 2017  
INVENTOR(S) : Peng Hu Page 1 of 1

It is certified that error appears in the above-identified patent and that said Letters Patent is hereby corrected as shown below:

In the Specification

In Column 11 at Line 18, After "fast PCI)" insert --,--.

In the Claims

In Column 14 at Line 15 (approx.), In Claim 9, change "recognized," to --recognized text,--.

Signed and Sealed this
Sixteenth Day of January, 2018

Joseph Matal
*Performing the Functions and Duties of the*
*Under Secretary of Commerce for Intellectual Property and*
*Director of the United States Patent and Trademark Office*